(12) United States Patent
Verma et al.

(10) Patent No.: US 12,105,716 B2
(45) Date of Patent: Oct. 1, 2024

(54) PARALLEL COMPUTE OFFLOAD TO DATABASE ACCELERATOR

(71) Applicant: Xilinx, Inc., San Jose, CA (US)

(72) Inventors: Hare K. Verma, Fremont, CA (US); Sonal Santan, San Jose, CA (US); Yongjun Wu, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 1693 days.

(21) Appl. No.: 15/632,082

(22) Filed: Jun. 23, 2017

(65) Prior Publication Data

US 2018/0373760 A1 Dec. 27, 2018

(51) Int. Cl.
*G06F 16/00* (2019.01)
*G06F 3/06* (2006.01)
(Continued)

(52) U.S. Cl.
CPC ........ *G06F 16/24557* (2019.01); *G06F 3/064* (2013.01); *G06F 9/3885* (2013.01);
(Continued)

(58) Field of Classification Search
CPC .. G06F 16/2457; G06F 16/26; G06F 16/2228; G06F 16/24557; G06F 3/064;
(Continued)

(56) References Cited

U.S. PATENT DOCUMENTS 5,553,280 A * 9/1996 Fortier ................ G06F 16/2379
9,424,315 B2 8/2016 Chamdani et al.
(Continued)

FOREIGN PATENT DOCUMENTS

JP 2005004243 A 1/2005
JP 2005129173 A 5/2005
(Continued)

OTHER PUBLICATIONS

Salami et al., AxleDB: A novel programmable query processing platform on FPGA, Apr. 28, 2017, retrieved on Jul. 25, 2023, retrieved from the Internet <URL: https://www.sciencedirect.com/science/article/pii/S0141933117302181> (Year: 2017).*
(Continued)

*Primary Examiner* — Tyler J Torgrimson
(74) *Attorney, Agent, or Firm* — Patterson + Sheridan, LLP (57) ABSTRACT

Embodiments herein describe techniques for preparing and executing tasks related to a database query in a database accelerator. In one embodiment, the database accelerator is separate from a host CPU. A database management system (DBMS) can offload tasks corresponding to a database query to the database accelerator. The DBMS can request data from the database relevant to the query and then convert that data into one or more data blocks that are suitable for processing by the database accelerator. In one embodiment, the database accelerator contains individual hardware processing units (PUs) that can process data in parallel or concurrently. In order to process the data concurrently, the data block includes individual PU data blocks that are each intended for a respective PU in the database accelerator.

20 Claims, 5 Drawing Sheets

(51) Int. Cl.
*G06F 9/38* (2018.01)
*G06F 16/245* (2019.01)
*G06F 16/2453* (2019.01)
*G06F 16/2455* (2019.01)

(52) U.S. Cl.
CPC .... *G06F 16/2453* (2019.01); *G06F 16/24532* (2019.01); *G06F 16/24569* (2019.01)

(58) Field of Classification Search
CPC ............... G06F 9/3885; G06F 16/2453; G06F 16/24532; G06F 16/2456
See application file for complete search history.

(56) References Cited

U.S. PATENT DOCUMENTS

| | | | |
|---|---|---|---|
| 9,613,097 | B2 | 4/2017 | Marais et al. |
| 10,289,632 | B1* | 5/2019 | Brealey ............. G06F 16/283 |
| 2012/0047126 | A1* | 2/2012 | Branscome ....... G06F 16/24569 707/713 |
| 2012/0117027 | A1 | 5/2012 | Shau et al. |
| 2012/0259843 | A1 | 10/2012 | Child |
| 2013/0117305 | A1 | 5/2013 | Varakin et al. |
| 2013/0346428 | A1* | 12/2013 | Viehland ................. G06F 16/22 707/756 |
| 2015/0046486 | A1 | 2/2015 | Asaad et al. |
| 2015/0234871 | A1 | 8/2015 | Viehland et al. |
| 2016/0077973 | A1* | 3/2016 | Patsilaras ............ G06F 12/0851 711/3 |
| 2016/0147819 | A1* | 5/2016 | Schreter ................ G06F 16/214 707/701 |
| 2016/0217176 | A1* | 7/2016 | Haviv .................... G06F 16/174 |
| 2017/0212942 | A1* | 7/2017 | Boileau ................... G06F 16/26 |
| 2017/0228422 | A1* | 8/2017 | Zhang .................. G06F 16/2455 |
| 2018/0189370 | A1* | 7/2018 | Bendel ................ G06F 16/2282 |

FOREIGN PATENT DOCUMENTS

| | | |
|---|---|---|
| JP | 2015535999 A | 12/2015 |
| JP | 2016130929 A | 7/2016 |
| WO | 2014055137 A1 | 4/2014 |

OTHER PUBLICATIONS

IBM, The Data Access Accelerator Library, retrieved on Nov. 2, 2023, retrieved from the Internet <URL: https://www.ibm.com/docs/en/ztpf/1.1.0.15?topic=reference-data-access-accelerator-library> (Year: 2021).*

StackOverflow, What is a Callback Function, May 5, 2009, retrieved on May 4, 2024, retrieved from the Internet <URL: https://stackoverflow.com/questions/824234/what-is-a-callback-function> (Year: 2009).*

Salami, B., et al., "AxleDB: A Novel Programmable Query Processing Platform on FPGA", Microprocessors and Microsytems, vol. 51, Apr. 28, 2017, pp. 142-164.

Office Acton from Chiense Patent Application No. 201880048004.3 dated Mar. 28, 2023.

Office Acton from Korean Patent Application No. 10-2020-7002082 dated Jun. 12, 2023.

Office Action from Japanese Patent Application No. 2019-570482 dated Mayy 23, 2023.

Mueller, Rene, et al., "Glacier a query-to-hardware compiler", User Interface Software and Technology, ACM, 2 Penn Plaza, Suite 701, New York, NY 10121-0701 USA, Jun. 6, 2010, pp. 1159-1162.

Ziener, Daniel, et al., "FPGA-Based Dynamically Reconfigurable SQL Query Processing", ACM Transactions on Reconfigurable Technology and Systems, ACM, US, vol. 9, No. 4, Aug. 22, 2016, pp. 1-24.

Becher, Andreas, et al., "Energy-aware SQL query acceleration through FPGA-based dynamic partial reconfiguration", 2014 24th International Conference on Field Programmable Logic and Applications (FPL), Technical University of Munich (TUM), Sep. 2, 2014, pp. 1-8.

Office Action from Chinese Patent Application No. 201880048004.3 dated Nov. 22, 2023.

Office Action from Chinese Patent Application No. 201880048004.3 dated Feb. 20, 2024.

* cited by examiner

PARALLEL COMPUTE OFFLOAD TO DATABASE ACCELERATOR

TECHNICAL FIELD

Examples of the present disclosure generally relate to a database accelerator, and in particular, to preparing and executing data blocks related to a database query in the database accelerator.

BACKGROUND

Real-time analytics are becoming increasingly compute intensive as the amount of data to be analyzed grows. This results in massive compute node scaling, which is expensive, and sometimes is infeasible. Querying and analyzing data stored in a database becomes more complicated and time consuming as the size of the database increases. Typically, a database management system (DBMS) uses one or more CPUs to perform a client query on a database. However, the amount of data that can be processed by the CPUs in parallel is limited.

SUMMARY

Techniques for operating a database accelerator are described. One example is a query processing system that includes a host central processing unit (CPU) configured to execute a database management system (DBMS) and a database accelerator separate from the host CPU where the database accelerator includes a plurality of processing units (PUs). The DBMS is configured to receive a query to execute on a database, retrieve a database table from the database corresponding to the query, reformat the database table into a data block where the data block comprises a plurality of PU data blocks (each corresponding to one of the plurality of PUs), and transmit the data block to the database accelerator The database accelerator is configured to process the plurality of PU data blocks using the plurality of PUs in parallel and forward results from the PUs to the DBMS.

Another example is database accelerator that includes a plurality of PUs implemented on one or more integrated circuits where the database accelerator is configured to receive at data block from a DBMS executing on a separate host CPU, and where the data block is based on a database table retrieved from a database and comprises a plurality of PU data blocks, each corresponding to one of the plurality of PUs. Moreover, the plurality of PUs is configured to process the plurality of PU data blocks in parallel. The database accelerator also includes a combiner configured to configured to receive individual results from each of the plurality of PUs and combine the individual results into a combined result which is forwarded to the DBMS.

Another example is non-transitory computer-readable storage medium storing instructions, which when executed on one or more processing devices, perform an operation for a DBMS. The operation includes receiving a query to execute on a database, retrieving a database table from the database corresponding to the query, reformatting the database table into a data block where the data block comprises a plurality of PU data blocks (each corresponding to one of a plurality of PUs in a database accelerator), where the database accelerator is separate from a CPU hosting the DBMS, transmitting the data block to the database accelerator, and receiving results generated from the plurality of PUs processing the data block in parallel.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for preparing and executing tasks related to a database query in a database accelerator. In one embodiment, the database accelerator is separate from a host CPU. For example, the database accelerator may be implemented using a programmable integrated circuit (e.g., a field-programmable gate array (FPGA)) or a non-programmable integrated circuit (e.g., an application specific integrated circuit (ASIC)). In any case, the database accelerator is communicatively coupled to the host CPU which executes a database management system (DBMS).

The DBMS can offload tasks corresponding to a database query to the database accelerator. The DBMS can request data from the database relevant to the query and then convert that data into a data block that is suitable for processing by the database accelerator. In one embodiment, the database accelerator contains individual hardware processing units (PUs) that can process data in parallel or concurrently. However, in order to process the data concurrently, the DBMS may convert the database tables retrieved from the database into a data block that includes individual PU data blocks that are each intended for a respective PU in the database accelerator.

The PUs in the database accelerator execute the PU data blocks in parallel. For example, the PUs may analyze the data as dictated by the client query (e.g., a structured query language (SQL) query) and then return individual results. The database accelerator combines the individual results and returns the combined results to the DBMS. In turn, the DBMS may merge the results received from the database accelerator with other data before transmitting query results to the client. In this manner, the DBMS can take advantage of the parallelization performed by the PUs in the database accelerator to execute a database query.

Figure 1:
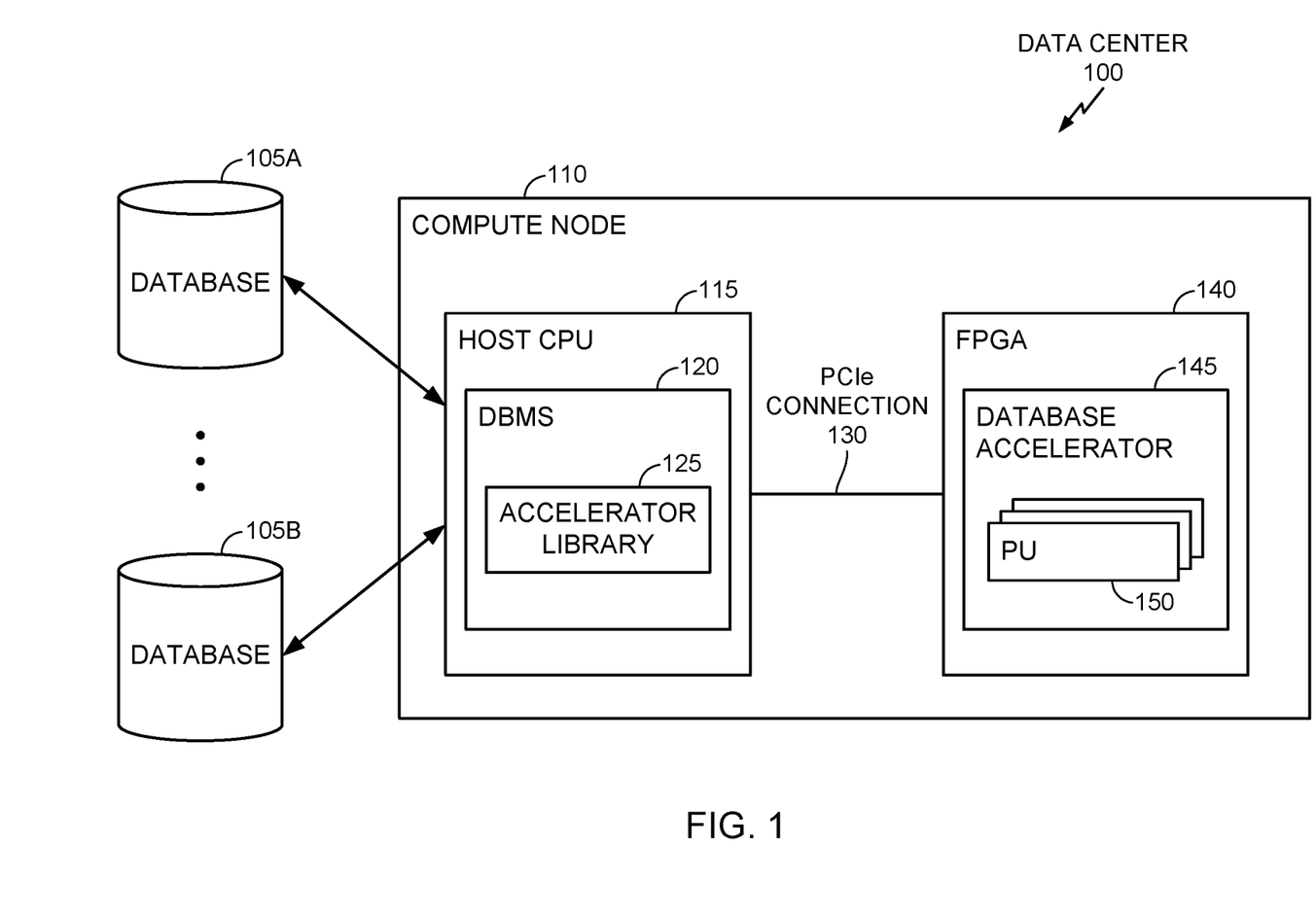
FIG. 1 illustrates a data center that includes a database accelerator, according to an example.

FIG. 1 illustrates a data center 100 (e.g., a query processing system) that includes a database accelerator 145, according to an example. The data center 100 includes databases 105A and 105B and a compute node 110. In one embodiment, the databases 105 are relational databases where the data stored in the databases 105 can be accessed by SQL queries. However, the embodiments herein are not limited to relational databases.

The compute node 110 includes a host CPU 115 and a FPGA 140 that are communicatively coupled via a PCIe connection 130. The host CPU 115 executes a DBMS 120 (e.g., a software application executing on the host CPU 115) that can offload tasks related to performing and analyzing a client query to the database accelerator 145. In one embodiment, the DBMS 120 is a relational DBMS (RDBMS). Although not shown, the DBMS 120 receives queries (e.g., client queries) to execute on the databases 105. For example, the queries may be a search, sort, word count, or query 6 which instruct the DBMS 120 to retrieve data from the databases 105, process the data, and then return a result to the client that transmitted the query. Moreover, the DBMS 120 may generate updated data which is then stored in the databases 105.

Instead of using the host CPU 115 to execute the query, the DBMS 120 offloads at least a portion of the task (or workload) corresponding to the query to the database accelerator 145 in the FPGA 140. In one embodiment, the database accelerator 145 may do a portion of the tasks associated with the query while the host CPU 115 performs the remaining tasks. The DBMS 120 can merge the results obtained from the database accelerator 145 with the results generated by the host CPU 115.

The FPGA 140 includes programmable logic in one or more programmable integrated circuits (not shown) which is configured to implement the database accelerator 145. One advantage of using an FPGA is that its programmable logic can be configured using a hardware description language into PUs 150 which can operate in parallel. That is, the FPGA 140 may be better suited for performing a large number of tasks (or threads) in parallel. Although an FPGA 140 is shown, in another embodiment the database accelerator 145 can be implemented on a non-programmable integrated circuit such as an ASIC. If an ASIC is used, the ASIC can be designed to include PUs 150 for performing tasks in parallel. As such, the embodiments described herein are not limited to a database accelerator 145 implemented in programmable integrated circuits.

To share data with the FPGA 140, the DBMS 120 contains an accelerator library 125 which include functions for moving data between the host CPU 115 and the FPGA 140. In one embodiment, the accelerator library 125 includes a conversion function (referred to herein as an enqueue compute) which converts the data received from the databases 105 into a format that can be processed in parallel by the database accelerator 145. For example, the data received from the databases 105 may be organized in database tables or database pages where data is arranged in rows and columns. Using the enqueue compute function, the DBMS 120 can convert the database tables into a format which can be assigned to the various PUs 150 in the database accelerator 145. In addition to the enqueue compute function, the accelerator library 125 may include other commands for writing, reading, and merging the data transmitted to, and received from, the database accelerator 145.

The PCIe connection 130 permits the host CPU 115 and the FPGA 140 to share data, however, any high speed connection can be used. In one embodiment, the DBMS 120 can perform a direct memory access (DMA) to transmit data to and from the database accelerator 145.

In one embodiment, the compute node 110 is a computing device such as a server. In another embodiment, the compute node 110 is a blade server. Alternatively, the compute node 110 may be a separate component in a computing device. For example, the compute node 110 may be a common substrate on which the host CPU 115 and the FPGA 140 are mounted—e.g., a motherboard or a field replaceable unit (FRU). In another arrangement, the host CPU 115 may be disposed on a motherboard while the FPGA 140 may be plugged into an expansion slot in the motherboard. Thus, the FPGA 140 can be added to the compute node 110 in order to increase the ability of the host CPU 115 to execute database queries. In another example, the host CPU 115 and the FPGA 140 can be packaged together.

In one embodiment, the client query is submitted to the data center 100 and is assigned to the DBMS 120. For example, the data center 100 may be a part of a cloud computing environment that stores client data in the databases 105. As described in more detail below, the DBMS 120 determines how much (if any) of the client query should be offloaded to the database accelerator 145. The DBMS 120 retrieves the relevant data from the databases 105, analyzes the data with the assistance of the database accelerator 145, and transmits results back to the client. Although the databases 105 and compute node 110 are shown as being co-located in the data center 100, in other embodiments, the databases 105 may be disposed at a different geographic location than the compute node 110.

Figure 2:
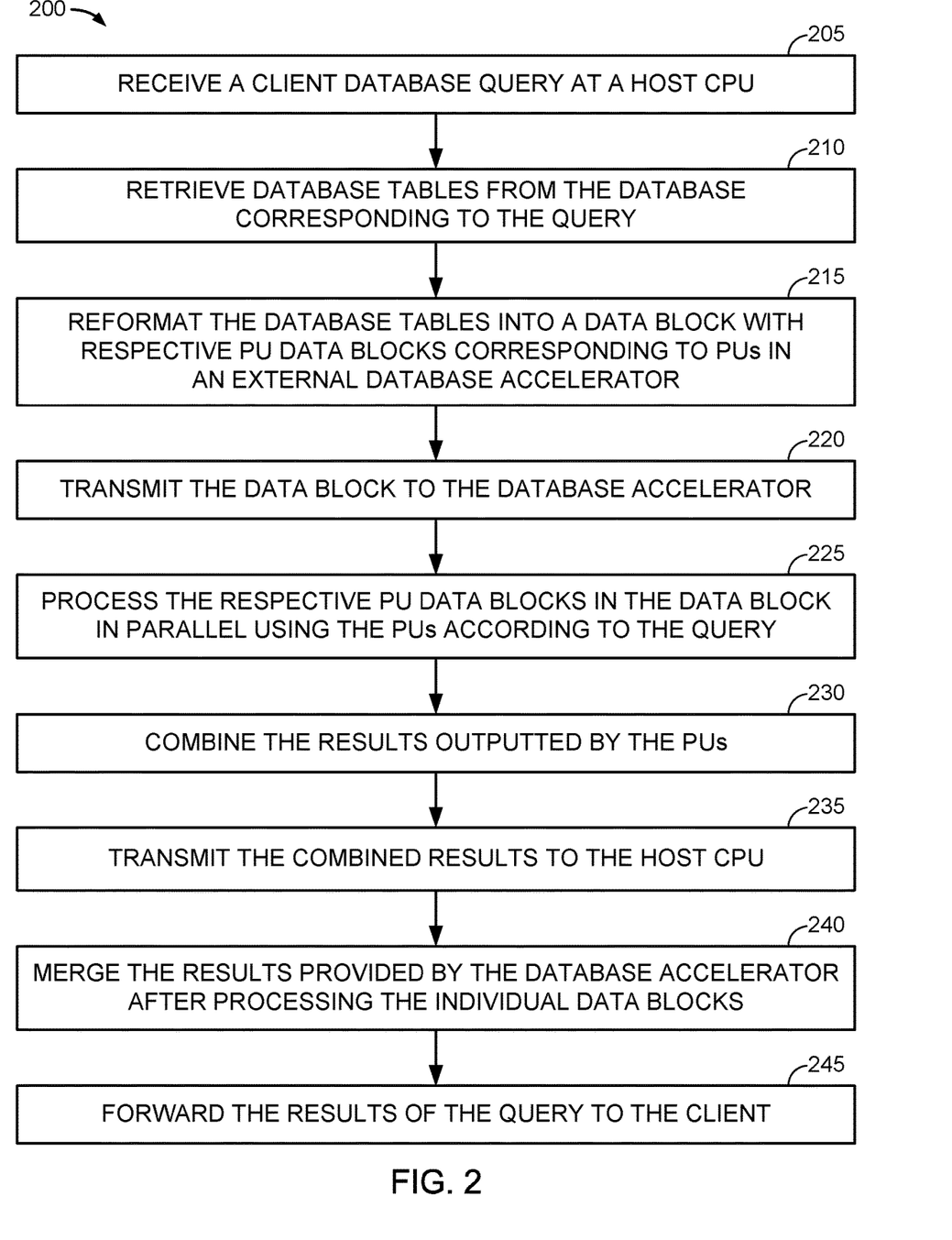
FIG. 2 is a flowchart for executing a query using a database accelerator, according to an example.

FIG. 2 is a flowchart of a method 200 for executing a query using a database accelerator, according to an example. For clarity, the blocks in the method 200 are described in parallel with FIG. 3 which provides a more detailed illustration of the functions and components of the DBMS 120 and the database accelerator 145.

At block 205, the DBMS 120 receives a client query to read, analysis, or update data stored in a database. The client query can originate from a person (e.g., an accountant performing payroll or a human resource manager who wants to identify employees who have a common attribute) or from a software application. In one embodiment, the client query is an SQL query.

Figure 3:
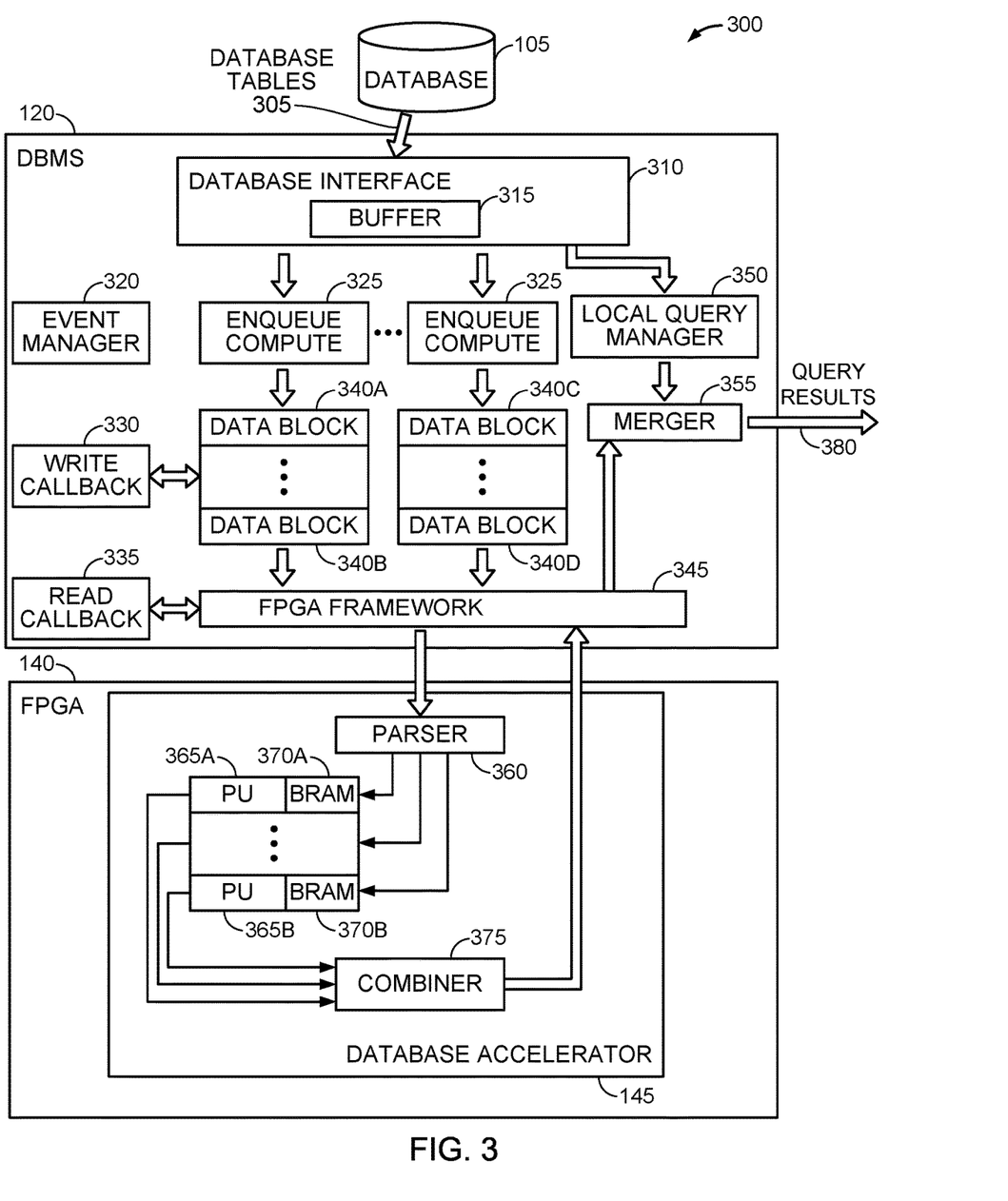
FIG. 3 illustrates a DBMS for offloading queries to a database accelerator, according to an example.

The DBMS 120 uses the client query to transmit a database query to the database 105. As shown in FIG. 3, the DBMS 120 includes a database interface 310 that permits the DBMS 120 to transmit a request for data to the database 105. For example, the DBMS 120 may include an index corresponding to the database 105 which indicates where and what data is stored in the database 105. The DBMS 120 can use the index to identify what data is relevant to the client query and then request that data from the database 105. In response to the request or query, the database 105 returns database tables 305 or database pages to the DBMS 120 via the database interface 310. In one embodiment, the database tables 305 arrange the data in rows and columns.

At block 215, the DBMS 120 reformats the database tables 305 into data blocks 340 that each has multiple PU data blocks that correspond to the PUs 365 in the database accelerator 145. In one embodiment, the data blocks 340 have a format that is more suitable to parallel processing than the format used by the database tables 305. The specific format of the data blocks 340 is described later in this disclosure.

As shown in FIG. 3, the DBMS 120 uses the enqueue compute function 325 from the accelerator library to reformat and queue the data blocks 340. In this example, the enqueue compute function 325 uses the database tables 305 (which can be stored in a buffer 315 in the database interface 310) to generate the data blocks 340. The DBMS 120 may use different enqueue compute functions 325 for generating data blocks 340 for different queries which are represented by the different vertical queues shown in FIG. 3. In one embodiment, the different vertical queues represent different threads. Executing different threads in the DBMS 120 may avoid overloading the host CPU.

In one embodiment, multiple data blocks 340 correspond to the same query. For example, to perform a query 6, the DBMS 120 may call the enqueue compute function 325 multiple times in order to generate multiple data blocks 340 that are processed by the database accelerator 145.

The data blocks 340 may include one or more database tables 305. For example, a data block 340 may contain all or a subset of the data in a single database table 305, or a data block 340 may contain data from multiple database tables 305. In another example, a single database table 305 may be divided into multiple data blocks 340 in which case the data blocks 340 are queued in the DBMS 120 as shown in FIG. 3 waiting processing by the database accelerator 145. In one embodiment, the queued data blocks 340 are sent one-by-one to the database accelerator 145.

Before transmitting the data blocks 340 to the database accelerator 145, the DBMS can perform a write callback function 330 on the data blocks 340. The write callback function 330 may be part of the accelerator library and can be performed before using a DMA to transfer the data blocks 340 to the database accelerator 145. The write callback function 330 is used to write data to the data blocks 340 before the blocks 340 are processed by the database accelerator 145. For example, the DBMS 120 may have received updated data from the client as part of the query, and as such, first writes that the updated data into the data blocks 340 before the blocks are analyzed by the PUs 365 in the database accelerator 145.

At block 220, the DBMS 120 transmits the data block 340 to the database accelerator 145. The DBMS 120 includes a FPGA framework 345 that serves as an interface between the DBMS 120 and the FPGA 140. In one embodiment, the FPGA framework 345 translates commands and instructions issued by the DBMS 120 into commands that can be interpreted by the FPGA 140. The FPGA framework 345 (e.g., a programmable integrated circuit framework) can be configured using a development environment which uses application code (e.g., OpenCL, C, C++, etc.) to enable the host CPU (e.g., an x86 based platform) to communicate with the FPGA 140. For example, the FPGA framework 345 permits the FPGA to be used as an accelerator—e.g., a database accelerator 145. One non-limiting example of a development environment for generating the FPGA framework 345 is Xilinx's SDx development environment which supports OpenCL, C, and C++ kernels. The FPGA framework 345, as well as the accelerator library 125 in FIG. 1, enables the DBMS 120 to offload tasks to the FPGA 140 and the database accelerator 145 similar to a host CPU offloading tasks to other accelerators such as a graphics accelerator or crypto accelerator.

At block 225, the database accelerator 145 processes the respective PU data blocks in the data block 340 in parallel using the PUs 365 according to the query. The data blocks 340 are received at a parser 360 in the database accelerator 145. The parser 360 may divide a data block 340 into separate PU data blocks which are then forwarded to a respective one of the PUs 365. As shown, the PUs 365 may contain a respective memory element—e.g., BRAM 370—for storing the PU data blocks as well as the results of processing the data blocks.

In addition to transmitting the data blocks 340, the DBMS 120 can also transmit instructions to the database accelerator 145 indicating how the PUs 365 should process the data blocks 340 according to the received client query. For example, if the query is a word count query, the DBMS 120 transmits to the database accelerator 145 the particular word specified by the client which is to be counted. The word is then sent to the PUs 365 which traverse their respective PU data blocks to identify any occurrences of that word. In another example, if the query is a sort, the DBMS 120 provides parameters for sorting the data blocks 340 which the PUs 365 then use to rearrange the data blocks 340. In this manner, the DBMS 120 can provide both the data to be analyzed as well as instructions or parameters for analyzing the data to the database accelerator 145.

The DBMS 120 includes an event manager 320 which determines when to transmit the data to the FPGA 140 using the FPGA framework 345. For example, the event manager 320 may monitor the queues containing the data blocks 340 and determine when a data block 340 (or blocks) should be transmitted to the database accelerator 145.

The PUs 365 analyze their respective blocks according to the parameters defined by the query and/or the DBMS 120. As mentioned above, the PUs 365 are separate hardware elements, and thus, can execute in parallel. For example, the PU 365A can analyze its corresponding PU data block at the same time the PU 365B analyzes its PU data block. Although only a few PUs 365 are shown in FIG. 3, the FPGA 140 can be configured such that the database accelerator 145 has tens or hundreds of PUs 365 each of which can operate independently of the other PUs 365 such that the data block 340 can be processed in parallel.

The PUs 365 forward the results of analyzing or processing the PU data blocks to a combiner 375. At block 230, the combiner 375 combines the results outputted by the PUs. For example, for a sort query, each PU 365 sorts its individual PU data blocks and then the combiner 375 may combine the sorted data block into a contiguous block of data. For a word count or search query, the combiner 375 may identify the total word count or combine the search results to identify all the locations in the data block 340 where a search term was found.

When the database accelerator 145 completes processing a received data block 340, the FPGA 140 informs the event manager 320 which executes a read callback function 335 which uses the FPGA framework 345 to instruct the FPGA 140 to transmit the results obtained by the database accelerator 145. At block 235, the FPGA 140 transmits the combined results to the host CPU and the DBMS 120 in response to the read callback function 335.

In one embodiment, although not shown, the DBMS 120 may call other functions to reformat the combined results received from the database accelerator 145. For example, if the data is to be stored in the database 105 (e.g., the database accelerator 145 changed or rearranged the data), the DBMS 120 may format the data into the format used by the database tables 305.

At block 240, the DBMS 120 merges the results received from the database accelerator 145. For example, the DBMS 120 may have divided a database table 305 into multiple data blocks 340 which were sequentially processed by the data-based accelerator 145. As the results from processing the data blocks 340 are received from the database accelerator 145, a merger 355 in the DBMS 120 may merge the results from sequentially processing the individual data blocks 340 into a combined result set that corresponds to the database table 305 rather than just the individual data blocks 340. Moreover, the merger 355 can also merge the results returned from the database accelerator 145 with result provided by a local query manager 350. For example, the DBMS 120 may perform some task related to a query using the local query manager 350 and other tasks for that same query using the database accelerator 145. The merger 355 can merge the results generated locally on the host CPU using the query manager 350 and the results generated by the database accelerator 145. However, in other embodiments, all the tasks associated with a query may be performed by the database accelerator 145. In that case, the merger 355 would not need to merge the results provided by the database accelerator 145 with local results.

At block 245, the DBMS 120 forwards the query results 380 to the client. The query results 380 may include a word count, search results, a result of sorting the data in a particular manner, and the like. In one embodiment, the DBMS 120 may also update the data stored in the database 105 in response to the query. For example, although not shown in FIG. 3, the DBMS 120 may use the database interface 310 to transmit updated database tables 305 to the database 105. In another example, the DBMS 120 may delete or move data stored in the database 105 in response to the query. In another embodiment, the DBMS 120 may store, delete, or move data in the database 105 in response to the client query without returning any results to the client. For example, the client query may be an instruction to change or update stored data in the database 105 which does not require results to be returned to the client. The DBMS 120 may nonetheless use the database accelerator 145 to, for example, update data that is stored in the database 105 even if the result provided by the database accelerator 145 are stored in the database 105 rather than being delivered to the client.

Although method 200 illustrates processing a single data block 340 in parallel using the PUs 365, in other embodiments, the database accelerator 145 can process multiple data blocks 340 in parallel. For example, half of the PUs 365 can process one data block 340 while the other half processes a different data block 340. Moreover, in one embodiment, the FPGA 140 can include multiple database accelerators 145 which can operate independently. Thus, one of the accelerators can process one of the data blocks for one of the vertical queues (or threads) shown in FIG. 3 while the other accelerator can process a data block from another one of the vertical queues in parallel.

Figure 4:
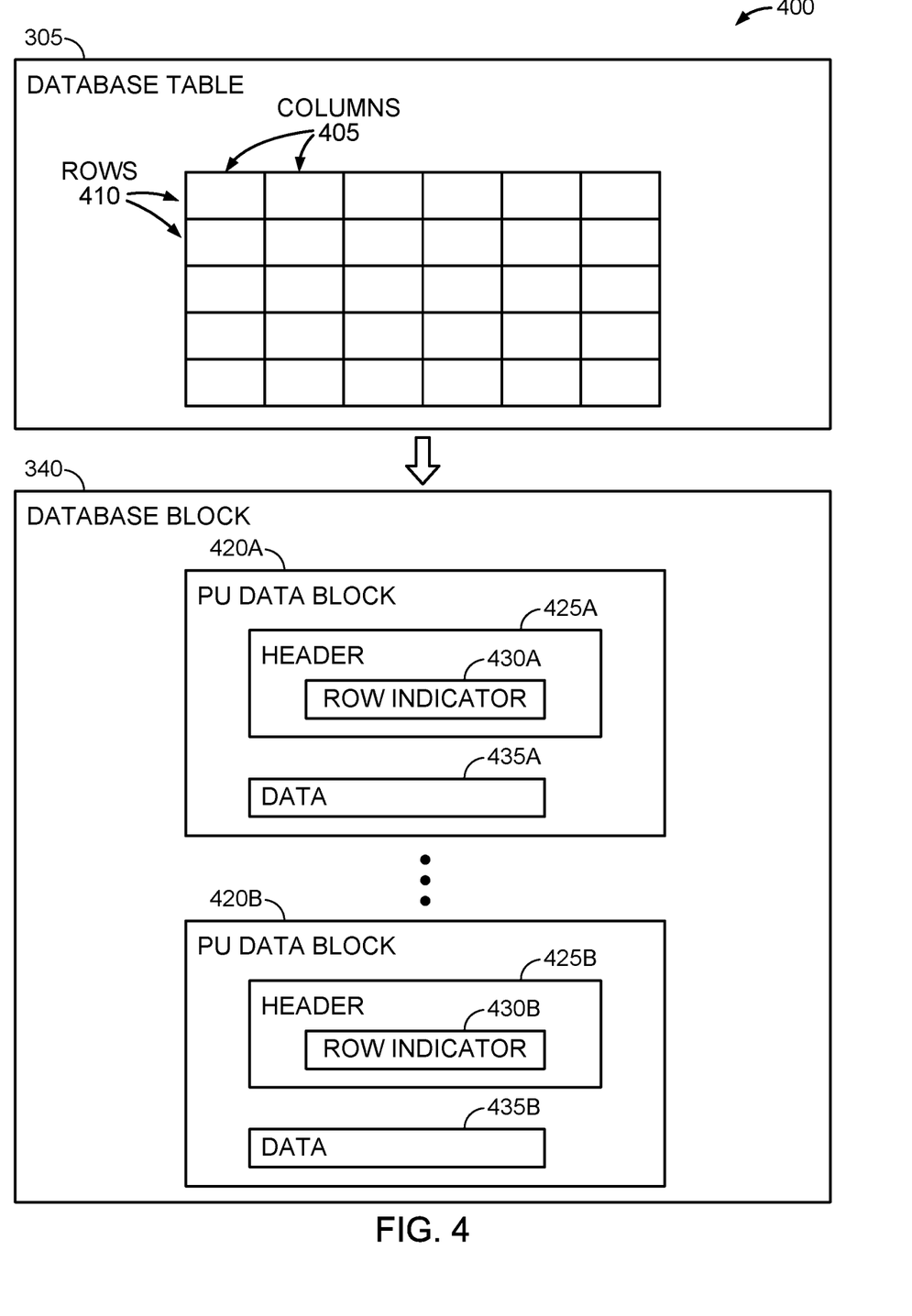
FIG. 4 illustrates converting a database table to a data block customized for parallel computation, according to an example.

FIG. 4 illustrates converting a database table 305 into multiple data blocks 340 customized for parallel computation, according to an example. For example, the memory in the FPGA implementing the database accelerator can be much smaller than the memory of the CPU hosting the DBMS which may correspond to the size of the database tables 305. For example, the database tables 305 may have a size of 256-512 GB while the memory of the FPGA is limited to 2-8 GB. Thus, dividing the database table 305 into the data blocks 340 may permit the FPGA to more efficiently process the data in the tables 305.

In one embodiment, the database table 305 represents data stored in a relational database. When querying the database, the DBMS may provide a list of rows, columns, or tables that it wants to retrieve from the database. FIG. 4 illustrates just one example of a database table 305 where the data is arranged in columns 405 and rows 410 which can be provided to the DBMS by the database. In one embodiment, a data block 340 can include portions of data from multiple database tables 305 by combining and selecting appropriate rows. Generating a data block 340 using selected portions of data from multiple database tables 305 may be useful when referencing multiple tables in other database operations such as a join.

As mentioned above, the format used to store or arrange the data in the database may not be ideal for analyzing the data using the PUs in the database accelerator which operate in parallel. As such, FIG. 4 illustrates performing a conversion 400 where the data in the table 305 is reformatted into the data block 340. In one embodiment, the conversion 400 is performed by the DBMS using a function (e.g., the enqueue computing function) in an accelerator library. However, in another embodiment, the conversion 400 may be performed by logic in the database accelerator—e.g., in hardware in the FPGA.

In FIG. 4, the data block 340 includes respective PU data blocks 420 which, as mentioned above, can be processed by respective ones of the PUs in the database accelerator. In one embodiment, the data block 340 may include a respective PU data block 420 for each PU in the database accelerator although this is not a requirement. For example, some of the PUs may be idle when the data block 340 is processed by the database accelerator, or the PUs which do not have a corresponding PU data block 420 may be used to perform other tasks related to the query.

Each PU data block 420 includes a header 425 and data 435. In one embodiment, the header 425 indicates the number of rows of the data 435 that is in the particular PU data block 420. For example, the PU data blocks 420 may not have the same amount of data 435, in which case, the DBMS 120 can indicate how much data is in the PU data block 420 by updating row indicators 430 in the headers 425.

The data 435 contains the data that was arranged in the database table 305. Put differently, the data 435 is the data that was stored at the columns 405 and rows 410 in the table 305. However, the DBMS 120 may store the data 435 differently in the PU data blocks 420. For example, the data 435 may not be arranged in rows and columns in the PU data blocks 420 but by some other means.

By reformatting the database table 305 into the data block 340 which contain respective PU data blocks 420, the data 435 can be analyzed by the PUs in the database accelerator. Moreover, by dividing up the data in the database table 305, the PUs can receive respective chunks of the data (e.g., the PU data blocks 420) which can be analyzed in parallel. In one embodiment, the PUs can process the PU data blocks 420 without waiting on results from other PUs. Stated differently, analyzing the PU data blocks 420 can be independent operations such that the PUs can operate in parallel without waiting on results from another PU.

Although not shown in FIG. 4, the DBMS may perform another conversion when either forwarding the results generated by the PUs in the database accelerator to the client or to the database. For example, if the client query instructs the DBMS to update data stored in the database (and the database accelerator is used to update the data), the DBMS may format the data returned from the database accelerator into a format similar to the database table 305 so that the data can be stored in a relational database.

Figure 5:
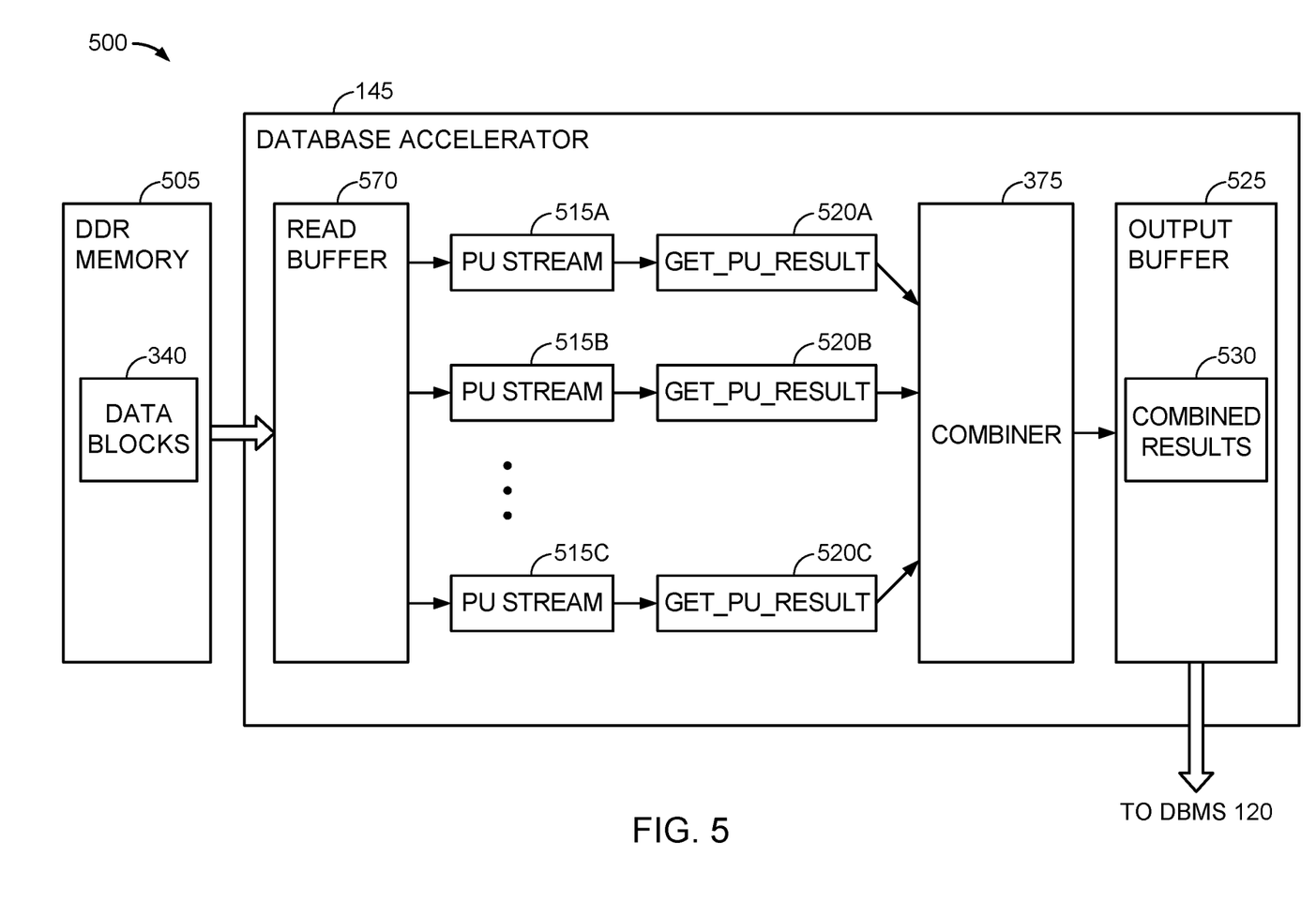
FIG. 5 illustrates performing parallel tasks in a database accelerator, according to an example.

FIG. 5 illustrates a system 500 for performing parallel tasks in a database accelerator 145, according to an example. The system 500 includes a double data rate (DDR) memory 505 that is communicatively coupled to the database accelerator 145. The DDR memory 505 includes the data blocks 340 which are prepared by the DBMS. In one embodiment, the DDR memory 505 transmits the data blocks 340 to a read buffer 570 in the database accelerator 145 in response to a command from the event manager or the DBMS. The data block 340 (or blocks) is then separated into respective PU streams 515 which correspond to a respective one of the PUs (not shown) in the database accelerator 145. Separating the data block 340 into the PU streams 515 takes advantage of the parallelization of the PUs in the database accelerator 145. A PU can process or analyze its respective PU stream 515 independently of the other PUs processing their PU streams 515. Thus, the PU streams 515 can be processed in parallel by the database accelerator 145.

Once processed, the database accelerator can call the GET_PU_RESULT functions 520 to retrieve the results from processing the PU streams 515. For example, if the query is a word count query, the PUs traverse the PU streams 515 to identify a particular word specified by the client which is to be counted. By calling the GET_PU_RESULT functions 520, the database accelerator can determine the number of occurrences of the word identified by each of the PUs.

The combiner 375 receives the results from calling the GET_PU_RESULT functions 520 and combines the results. In this manner, the results from the PUs can be merged into combined results 530 of the database accelerator 145 which are stored in an output buffer 525. In one embodiment, the output buffer 525 forwards the combined results the DBMS 120 in response to an instruction from the event manager. For example, the event manager may monitor the database accelerator 145 to determine when all of the PUs have finished processing a particular data block 340 (or blocks). Once complete, the event manager instructs the database accelerator 145 to forward the combined result 530 to the DBMS 120.

In one embodiment, the functions used to process and transfer the data within the database accelerator 145 can be simulated from software code such as C, C++, Open CL, and the like rather than generating the functions directly from hardware description languages (HDL) or register transfer level (RTL) code. For example, a high-level synthesis (HLS) application can configure a programmable circuit (e.g., an FPGA) using software code without the need of a programmer to manually create RTL code. Moreover, the HLS application can include libraries for handling abstract concepts such different data types (e.g., integers, floating points, etc.), streaming data structures, advanced mathematical formulas (e.g., sine, cosine, square root, etc.), or digital signal processing (e.g., convolution, amplitude modulation, decoders, etc.).

In one embodiment, the HLS application is used to generate the streaming environment shown in FIG. 5. For example, a portion of the data block 340 can be fed into the PU streams 515 with different read and write data widths which can be designed to keep each PU operating in parallel with maximum efficiency. Moreover, a DDR burst length when transmitting the data blocks 340 from the DDR memory 505 to the read buffer 510 can be long enough to reduce DDR inefficiency. A wide DDR width maximizes efficiency with optimal PU resource use and number of processing cycles. In one embodiment, the usage of block RAMs as the read buffer 510 and the output buffer 525 can be reduced by striped read buffer.

In one embodiment, for a SQL query, the results from the parallel executing PUs can be combined for a single Kernel or Compute Unit on the FPGA. For example, one query 6 processing unit that has a data block size of 2 MB and a PU block size of 32 KB can be performed with a greater than 25 times improvement of the execution time when compared to performing the query 6 operation on a host CPU. As the number of PUs increase in the database accelerator 145, the execution time can be further improved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware embodiment, an entirely software embodiment (including firmware, resident software, micro-code, etc.) or an embodiment combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A query processing system, comprising:
a host central processing unit (CPU) configured to execute a database management system (DBMS);
wherein the DBMS is configured to communicate with a database accelerator separate from the host CPU and the DBMS, wherein the database accelerator comprises a plurality of processing units (PUs), wherein each of the plurality of PUs comprises separate hardware elements in the database accelerator;
wherein the DBMS is configured to receive a database query;
wherein the DBMS is configured to retrieve a database table from a database corresponding to the database query;
wherein the DBMS is configured to reformat the database table into a plurality of PU data blocks, each of the PU data blocks corresponding to one of the plurality of PUs in the database accelerator, wherein reformatting the database table comprises using a conversion function from an accelerator library of the DBMS to convert data received from the database into a format enabling processing in parallel by the database accelerator;

wherein the DBMS performs a write callback function on the plurality of PU data blocks, the write callback function being part of the accelerator library of the DBMS; and wherein, after performing the write callback function, the DBMS is configured to transmit the plurality of PU data blocks to the database accelerator and receive results from the database accelerator derived from processing the plurality of PU data blocks using the plurality of PUs in parallel.

2. The query processing system of claim 1, wherein the database table comprises rows and columns, wherein each of the plurality of PU data blocks comprises a portion of data stored in the rows and columns of the database table, and wherein the DBMS is configured to add headers to each of the plurality of PU data blocks indicating an amount of data in each of the plurality of PU data blocks in response to reformatting the database table.

3. The query processing system of claim 1, wherein the database accelerator comprises a combiner configured to receive individual results from each of the plurality of PUs and combine the individual results into a combined result which is forwarded to the DBMS.

4. The query processing system of claim 1, wherein the database query comprises a structured query language (SQL) query.

5. The query processing system of claim 1, wherein the write callback function writes data to the plurality of PU data blocks before the plurality of PU data blocks are processed by the database accelerator.

6. The query processing system of claim 5, wherein the DBMS comprises a programmable integrated circuit framework that serves as an interface between the DBMS and the one or more programmable integrated circuits, wherein the programmable integrated circuit framework is configured to translate instructions issued by the DBMS into commands that can be interpreted by the one or more programmable integrated circuits.

7. The query processing system of claim 5, wherein the one or more programmable integrated circuits form a field-programmable gate array (FPGA).

8. The query processing system of claim 1, wherein the database accelerator is hosted on one or more application specific integrated circuits (ASICs).

9. A database accelerator, comprising:
a plurality of PUs implemented on one or more integrated circuits of the database accelerator, wherein the database accelerator is configured to receive a plurality of PU data blocks from a DBMS executing on a separate host CPU and is separate from the database accelerator, wherein the plurality of PU data blocks is based on a database table retrieved from a database and based on reformatting of the database table, such that each of the plurality of PU data blocks corresponds to one of the plurality of PUs, wherein each of the plurality of PUs is implemented on one of the one or more integrated circuits, and wherein reformatting the database table comprises using a conversion function from an accelerator library of the DBMS to convert data received from the database into a format enabling processing in parallel by the database accelerator;

wherein the DBMS performs a write callback function on the plurality of PU data blocks, the write callback function being part of the accelerator library of the DBMS;

wherein the plurality of PUs is configured to process the plurality of PU data blocks in parallel; and a combiner configured to receive individual results from each of the plurality of PUs and combine the individual results into a combined result which is forwarded to the DBMS.

10. The database accelerator of claim 9, wherein the database table comprises rows and columns, wherein each of the plurality of PU data blocks comprises a portion of data stored in the rows and columns of the database table, and wherein the DBMS is configured to add headers to each of the plurality of PU data blocks indicating an amount of data in each of the plurality of PU data blocks in response to the reformatting the database table.

11. The database accelerator of claim 9, wherein the database table is retrieved from the database using a SQL query.

12. The database accelerator of claim 9, wherein the write callback function writes data to the plurality of PU data blocks before the plurality of PU data blocks are processed by the database accelerator.

13. The database accelerator of claim 12, wherein the database accelerator is configured to communicate with a programmable integrated circuit framework in the DBMS that serves as an interface between the DBMS and the one or more programmable integrated circuits, wherein the programmable integrated circuit framework is configured to translate instructions issued by the DBMS into commands that can be interpreted by the one or more programmable integrated circuits.

14. The database accelerator of claim 12, wherein the one or more programmable integrated circuits form a field-programmable gate array (FPGA).

15. A non-transitory computer-readable storage medium storing instructions, which when executed on one or more processing devices, perform an operation for a DBMS, the operation comprising:
receiving a database query;
retrieving a database table from a database corresponding to the database query;
reformatting the database table into a plurality of PU data blocks, each of the plurality of PU data blocks corresponding to one of a plurality of PUs in a database accelerator, wherein the database accelerator is separate from the DBMS wherein each of the plurality of PUs comprises separate hardware elements in the database accelerator,
wherein reformatting the database table comprises using a conversion function from an accelerator library of the DBMS to convert data received from the database into a format enabling processing in parallel by the database accelerator;
wherein the DBMS performs a write callback function on the plurality of PU data blocks, the write callback function being part of the accelerator library of the DBMS;
transmitting the plurality of PU data blocks from the DBMS to the database accelerator; and receiving, at the DBMS, results generated from the plurality of PUs in the database accelerator processing the plurality of PU data blocks in parallel.

16. The computer-readable storage medium of claim 15, wherein the database table comprises rows and columns, wherein each of the plurality of PU data blocks comprises a portion of data stored in the rows and columns of the database table, and wherein the DBMS is configured to add headers to each of the plurality of PU data blocks indicating an amount of data in each of the plurality of PU data blocks in response to reformatting the database table.

17. The computer-readable storage medium of claim 15, wherein the database query comprises a SQL query.

18. The computer-readable storage medium of claim 15, wherein transmitting the plurality of PU data blocks to the database accelerator comprises:
    translating instructions issued by the DBMS into commands that can be interpreted by the database accelerator using a programmable integrated circuit framework, wherein the programmable integrated circuit framework serves as an interface between the DBMS and one or more programmable integrated circuits implementing the database accelerator.

19. The computer-readable storage medium of claim 18, wherein the write callback function writes data to the plurality of PU data blocks before the plurality of PU data blocks are processed by the database accelerator.

20. The computer-readable storage medium of claim 18, wherein the accelerator library includes functions for moving the plurality of PU data blocks between a CPU and the one or more programmable integrated circuits.

* * * * *